May 4, 1965 R. A. MAGNUSON 3,181,427
HYDRAULIC MOTOR CONTROL SYSTEM
Filed Jan. 25, 1963 2 Sheets-Sheet 1
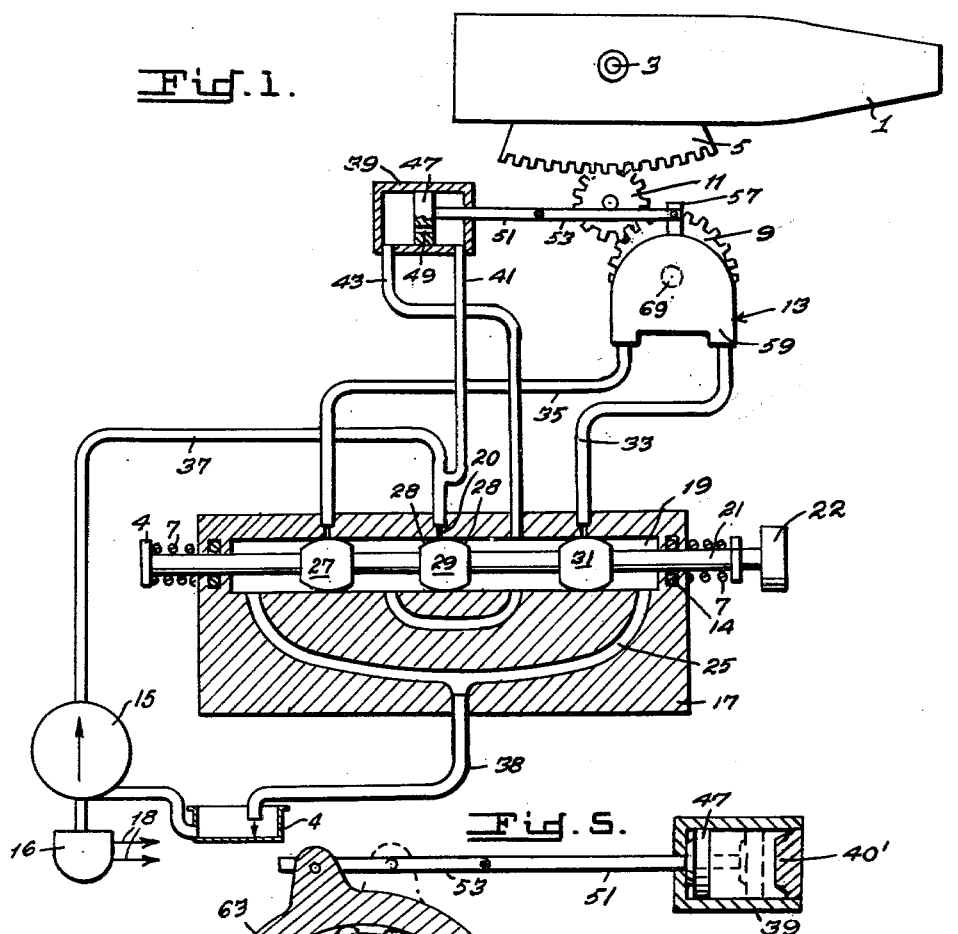
INVENTOR.
Roland A. Magnuson
BY
Edward J. Kelly, Herbert Berl & C. R. White May 4, 1965  R. A. MAGNUSON  3,181,427
HYDRAULIC MOTOR CONTROL SYSTEM
Filed Jan. 25, 1963 2 Sheets-Sheet 2
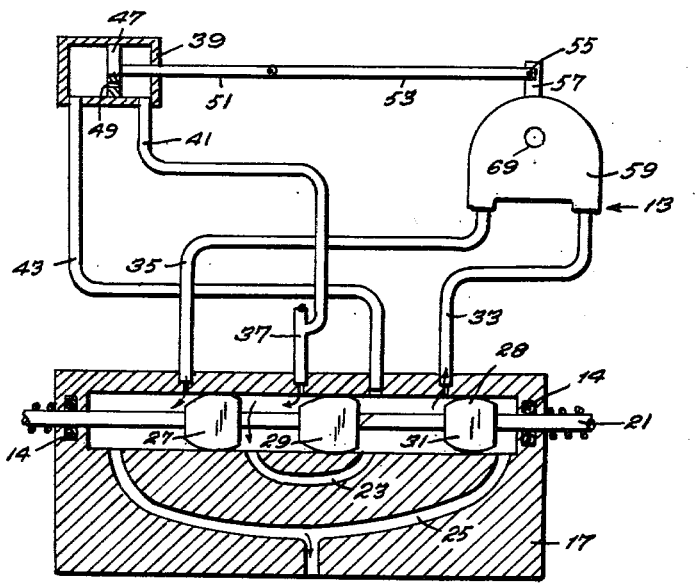
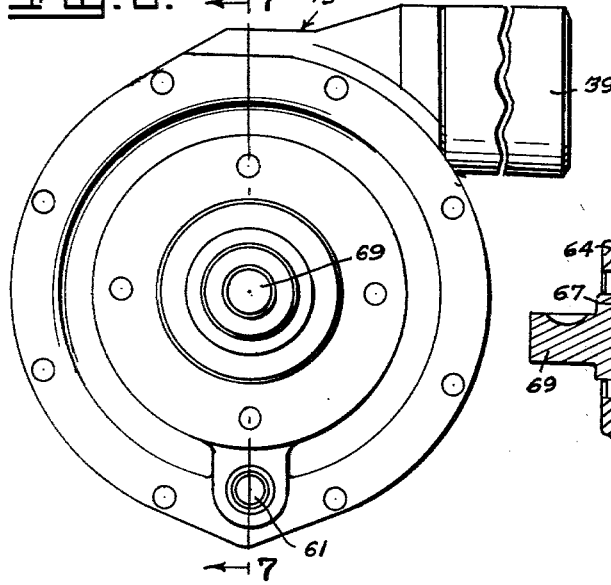
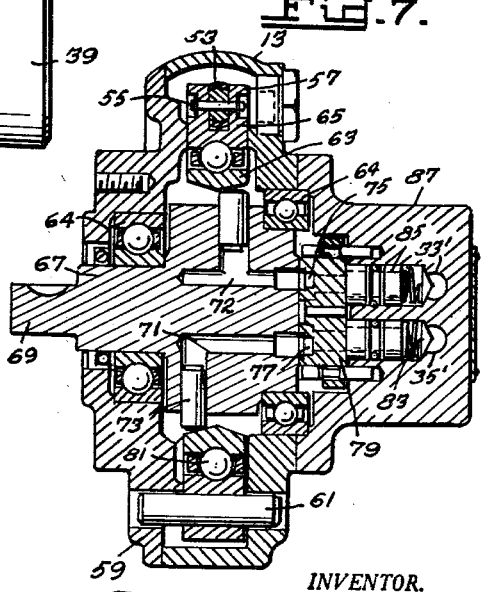
INVENTOR.
Roland A. Magnuson
BY
Edward J. Kelly, Herbert Berl & C. R. White

United States Patent Office 3,181,427
Patented May 4, 1965

3,181,427
HYDRAULIC MOTOR CONTROL SYSTEM
Roland A. Magnuson, Seattle, Wash., assignor, by mesne assignments, to the United States of America as represented by the Secretary of the Army
Filed Jan. 25, 1963, Ser. No. 254,026
8 Claims. (Cl. 91—202)

This invention relates in general to control systems for variable displacement hydraulic motors used in driving a load and in particular to gun control systems in which the displacement of the hydraulic motor is automatically adjusted to suit varying torque requirements encountered in depressing, elevating or traversing the gun.

Modern armament requires large caliber guns to be mounted on vehicles, and large expenditures of energy are required to manipulate such guns. This energy is usually supplied by batteries or other components which have limited amounts of energy available and have to be transported by the vehicle. These batteries operate hydraulic components to elevate and traverse the weapon. The amount of energy necessary to move the gun varies with vehicle inclination. On level ground the torque at the trunnions, required to raise and lower an equilibrated gun, is fairly constant throughout the entire range of elevation. However, placing the gun platform on an inclination such as a rising slope will greatly increase the torque necessary to depress the gun and greatly decrease the torque required to elevate the gun. A similar torque increase is also required to traverse the gun on such a slope. Obviously, the greater the slope, the greater are the torque requirements.

Prior to the present invention, vehicle mounted guns have usually been manipulated with a constant pressure-constant displacement hydraulic motor system in which the motor has to be geared to the gun with such a ratio that the torque at the trunnions developed by the motor will equal the maximum torque load which has to be overcome. Each turn of the motor consumes a fixed volume of fluid, and each volume of fluid contains a fixed amount of pressure energy maintained by a hydraulic pump unit operated by an electric motor. This motor is energized by batteries carried by the vehicle. Such motors run at maximum efficiency only when the torque developed by full system pressure is just sufficient to overcome the torque load. At lesser loads such as those encountered when the vehicle is on level ground, at the same motor speed, the motor consumes the same quantity of fluid and requires the expenditure of the same amount of energy as when heavier loads are moved. However, only an amount of energy equal to the lesser load is delivered. The energy used is dissipated in throttling in a control valve or the motor would accelerate to a higher speed. When moving low loads at high motor speed, energy is wasted at a high rate since larger volumes of fluid than are necessary are used to move the load.

A system which utilizes a variable displacement motor with the displacement manually controlled so that the motor torque would equal the load torque and would economically use the available fluid. However such a system would be impractical because constant manual manipulation of the control is required and there would be undesirable acceleration and deceleration properties near the zero stroke point of the motor. Furthermore, with such an arrangement considerable operator training would be necessary for successful and economical operation.

It is therefore an object of the present invention to provide a hydraulic system having a constant pressure source and a variable displacement motor for moving varying loads in which the displacement of the motor is automatically adjusted to suit the varying torque requirements of the load.

A further object of the invention is to provide a gun control system which efficiently uses the pressure energy supplied to a variable displacement hydraulic motor in traversing and elevating the gun.

Another object of the present invention is to provide a gun control system in which the hydraulic motor used to move the gun is arranged to control its own stroke.

Another object of the invention is to provide a gun control which accurately aims the gun at a fixed or slowly moving target and which rapidly manipulates the gun when necessary.

Objects and advantages other than those set forth will be apparent from the following description when read in connection with the accompanying drawing in which:

FIGURE 1 is a schematic diagram partly in section and not to scale indicating essential elements of the hydraulic gun control system.

FIG. 2 is a schematic diagram similar to FIG. 1 which illustrates the valve spool in the system being displaced from the position in FIG. 1 to permit fluid flow within the system.

FIG. 3 is a side elevational view of a fragment of the valve spool of FIGS. 1 and 2 showing one of the lands.

FIG. 4 is a top view of FIG. 3 taken along line 4—4 of FIG. 3.

FIG. 5 is a diagrammatical cross-sectional view of the variable displacement hydraulic motor and the associated stroke control cylinder.

FIG. 6 is a side elevational view of the hydraulic motor utilized in the system.

FIG. 7 is a sectional view of FIG. 6 taken along lines 7—7 of FIG. 6.

FIG. 8 is a cross-sectional view of the stroke control cylinder of FIG. 6.

As shown in FIG. 1, a gun 1 having trunnions 3 which may be mounted for rotation in a traversible turret mounted in a vehicle or other support. Secured to the underside of the gun is elevating segment gear 5. The gun is actuated by gears 9 and 11 with gear 9 being secured to the output drive shaft 69 of a variable stroke hydraulic motor 13 which is fixed in the vehicle. Motor 13 is connected by conduits or tubular fluid flow lines 33, 35, 37, 38 to any suitable hydraulic pump unit 15 which provides a constant fluid pressure source for the system. A reservoir 4 is connected in line 38 between valve 17 and pump unit 15. The pump unit includes a suitable conventional constant displacement pump which is driven by an electric motor 16 connected to the vehicle electrical system by wire conductors 18. Connected to the fluid conducting lines between the pressure source and the motor is a valve housing 17. The interior of valve housing 17 is formed with a cavity 19 in which valve spool 21 is mounted for reciprocal longitudinal movement. Suitable orifices including orifice 20 are provided in the valve housing to connect cavity 19 to the fluid conducting lines. The valve housing has also formed therein fluid flow passages 23 and 25 connected to the cavity for a purpose to be later described. Resilient rings 14 in compartments in each end of housing 17 surround the spool and prevent fluid leaks between spool 21 and housing 17. The spool 21 is formed with lands 27, 29 and 31 which fit closely in the housing and divide cavity 19 into four separate chambers. Lands 27, 29 and 31 prevent direct fluid flow between these chambers and when positioned in front of the orifices in housing 17 for conduits 33, 35 and 37 prevent fluid flow in these conduits and in the housing. The spool 21 may be spring centered in cavity 19 by coil springs 7 so that the lands completely close these last mentioned housing orifices. The lands may be tapered, cylindrical or any shape to fit the internal dimensions of cavity 19.

As best shown in FIGS. 3 and 4, the lands 27, 29 and 31 are cylindrical in shape and are formed with downwardly inclined flats 28 on the outer surface of each land. These flats control the fluid flow within the system and are proportioned so that the amount of fluid permitted to flow in housing 17 is proportional to the amount of valve spool displacement. Instead of flats 28 suitable metering notches (not shown) may be cut into lands 27, 29, 31 to control the orifice openings in the housing 17 for conduits 33, 35 and 37. Thus, as each valve spool land is displaced away from its centered position of FIG. 1, the respective orifice opening becomes progressively greater to permit greater amounts of fluid to flow within the housing and the system.

As shown in FIG. 1, land 29 is normally positioned to block orifice 20 in the valve housing to prevent the flow of fluid through line 37 into the valve housing 17 and lands 27 and 31 are positioned to prevent the flow of fluid between the motor 13 and valve housing 17. Suitable conduits and pressure relief valves (not shown) may be used to bypass valve housing 17 and return fluid displaced by motor 15 to a suitable reservoir in unit 15 when lands 27, 29, 31 sufficiently limit the amount of fluid flow in valve housing 17.

FIG. 2 shows the valve spool displaced to the right in the direction of the arrow by handle 22. When this displacement is made, land 29 has been moved to completely open the orifice in housing 17 for pressure conduit 37 and lands 27 and 31 completely open the orifice for conduits 33 and 35. Passage 23 permits the fluid to flow in valve housing 17 bypassing land 29, and into conduit 33 to operate hydraulic motor 13 for counter clockwise rotation of shaft 69 as viewed in FIG. 5. Since, as mentioned above, land 27 has also been moved, conduit 35 returns the fluid to the valve cavity 19. Passage 25 in the valve housing and conduit 38 provides the means for returning the fluid back to the reservoir in the pump unit 15. This path of fluid flow is shown by arrows in FIG. 2.

If the spool is displaced an appropriate distance to the left, the flow of fluid will be reversed. Lands 27, 29 and 31 in FIG. 2 will be positioned to the left of orifices in housing 17 serving conduits 34, 43 and 33, respectively. When the valve spool is so displaced fluid will enter the valve housing from conduit 37 around land 29 via passage 23 into conduit 35 to motor 13. Conduit 33 then permits the fluid to return from the motor to the valve housing. The returning fluid flows through passage 25 and then through conduit 38 and reservoir 4 back to pump unit 15. The motor drive shaft 69 of FIG. 5 will rotate clockwise. Thus, gun 1 will be elevated or depressed depending on the direction of fluid flow within the conduits 33, 35. A hollow cylinder 39 fixed in the vehicle or to the motor 13 which controls the stroke of the motor is connected to the valve housing by fluid conducting conduit 43 and to the pressure conduit 37 by conduit 41. As shown in FIGS. 1, 2, 5 and 8, a piston is reciprocally mounted in this cylinder. The piston includes cylindrical head 47 which fits closely in the cylinder 39 and is formed with an orifice 49 (FIG. 8) which permits the passage of the fluid from one side of the piston head to the other when the fluid flow is low. Suitable spacers such as the ring like spacer 40 of FIG. 8 or the projecting spacer 40' of FIG 5 may be fixed in the cylinder to limit the movement of piston 47 in cylinder 39 as it approaches cylinder head 39' which forms one end of the cylinder. This limits the movement of bearing 65 and establishes the zero stroke of the motor. As shown in FIG. 8, head 39' of cylinder 39 has orifice 43' for conduit 43 and cylinder 39 has orifice 41' for conduit 41. Connected to the piston head is a rod or arm 51 which extends outwardly from one end of the cylinder. An arm 53 pivotally connected to the piston arm by pin 52 extends to the extension 57 on motor bearing 65 in hydraulic motor 13. A pin 55 pivotally connects the arm 53 to extension 57 integrally formed on pivoted motor bearing 65. FIGS. 7 and 8 show the connection between the variable displacement motor and the piston. The motor bearing is pivotally mounted by pin 61 to the motor housing 59 fixed in the vehicle as shown in FIG. 5. The bearing 65 is used to move the roller bearing race 63 eccentric to the cylinder 67. FIG. 5 shows the bearing moved to its extreme position for maximum motor stroke.

The variable displacement hydraulic motor 13 is adapted to be actuated by the fluid flowing from the pump through the valve housing 17. The motor 13 is provided with a rotatable cylinder 67 mounted in the motor housing on ball bearings 64. The cylinder has an integrally formed drive shaft 69 connected through suitable gearing to the gear 11 meshing with the gun elevating arc 5. The cylinder has a plurality of generally radially extending bores 71 in which are mounted for reciprocation small pistons 73. Axial ports 72 in the cylinder 67 communicate with bores 71. At their inner ends the ports 72 are adapted to communicate with ports 75 and 77 provided in stationary flat valve 79. The ports 77 and 75 are crescent shaped and are adapted to communicate with the axial ports 72 in the cylinder as the cylinder rotates and the ports pass through the arc of ports 77 and 75. Backup piston springs 83 hold tubular backup pistons 85 in head 87 against the motor flat valve 79. Two equalizer pistons (not shown) in the flat valve balance the hydraulic forces which tend to separate the flat valve 79 from the ported end of motor cylinder 67.

The bearing race 63 is rotatably mounted in the pivoted bearing 65 upon ball bearings 81. When the bearing 65 is moved a sufficient amount by arm 53 the bearing race and the cylinder 67 will be eccentric with respect to each other to provide piston stroke.

Counterclockwise rotation of the cylinder and drive shaft 69 is accomplished when the valve spool is displaced as in FIG. 2 and oil under pressure is furnished by the constant displacement pump to the motor through the valve housing 17. The oil flows out of the valve housing via conduit 33 to port 33' (FIG. 7) in motor head 87. Oil entering port 33' flows through the head, hollow upper backup pistons 85, through suitable passages in valve 79. The oil then flows in upper crescent 75 through axial ports 72 in the motor cylinder 67 to radial bores 71 to force the pistons 73 passing through the arc of the upper motor flat valve crescent outward. This causes the inner race 63 of bearing 65 and the cylinder 67 to rotate counterclockwise as viewed in FIG. 5. Oil is discharged by the motor rolling pistons 73 as the pistons pass through the arc of the lower valve crescent. The oil is forced by the pistons into axial ports 72 in the cylinder 67 and into lower crescent 77 through passages in the flat valve 79. The discharged oil then flows through the lower backup pistons and out of port 35' in head 87 to valve housing 17 via conduit 35. The pistons 34 are maintained in contact with the roller bearing race 65 by centrifugal force plus hydraulic pressure. By reversing the fluid flow the cylinder 67 and its drive shaft will have clockwise rotation. Increased motor stroke is obtained by increasing the eccentricity of race 63 with respect to cylinder 67. The operation of such piston driven hydrodynamic motors can be found in U.S. Patent No. 2,406,138 to W. Farris et al.

*Low flow operation*

When the operator desires to aim the weapon at a stationary or slowly moving target the weapon must be moved at low speeds for accurate positioning. Depending on direction of target movement, the valve spool is manually displaced from the center position in either direction to open the orifices in the housing controlled by the lands from 0 to 75% of the total possible orifice opening. Since the amount of fluid flow in valve housing 17 is controlled by lands 27, 29, and 31, and their associated flats 28, there will be a relatively low volume of fluid per unit time or low flow of fluid through the system and the motor speed is low. At low flows orifice 49 short circuits land 29 to permit full system pressure on both sides of the stroke control piston. This short circuit occurs because the opening 29' in the valve housing is only partially opened by land 29 and this partial opening is small when compared to the opening 49 in the stroke control piston. Since the area of the head end of the piston is greater than the area of the rod end of the piston (due to rod 51), the opposing forces on the piston head are unequal and the piston is moved to the left in FIG. 5, and the hydraulic motor bearing 65 is moved to a stationary position where there is maximum stroke in which the maximum amount of fluid is displaced for each turn of the motor. This is desirable for fine control of the weapon under all conditions. Motor speed and the velocity at which gun 1 is moved is controlled by controlling the amount of oil which flows in the valve housing passages for the operation of motor 13. The flats or metering notches described above which are cut in the valve spool lands are proportioned so that fluid flow and weapon velocity are proportional to the displacement of valve spool 21. Thus, when the valve spool has been displaced so the orifices are 75% open, the weapon moves with a low speed. With lesser openings, the gun would move with a proportionally lesser speed. During the low flows, the stroke of the motor is fixed. If the stroke of the motor were not fixed, but assumed a value dependent on the size of the load, then a given valve displacement might result in a high gun velocity in one instance and in a low gun velocity in another instance. This characteristic would not encourage accurate weapon positioning. Thus, for low flows fixed maximum motor stroke is desirable to obtain a system which allows accurate positioning of the gun. Since fine control only accounts for a minor portion of the total gun motion and since few turns of the motor are occupied by fine control, there is no extravagant expenditure of oil from the pressure source.

*High flow operation*

When the operator desires to move the weapon from loading to firing position or from one target to the general area of another target, it is obviously desirable to move the weapon at a high speed. Since this mode of operation accounts for the bulk of gun motion and for the bulk of oil expenditure from the pressure source, high efficiency is desirable. Rapid gun motion is accomplished by displacing the valve spool so that the valve orifices are from 75% to 100% open. Such valve spool displacement permits moderate and high flow in the system as shown in FIG. 2. Such high fluid flow results in high motor speed. At moderate or high flows, there is no short circuit of land A through orifice 49 due to the fact that at this spool position the opening 29' in the valve housing is large when compared to the opening 49 in the stroke control piston. The motor stroke automatically adjusts so that a constant and high percentage of the system pressure is always applied to the motor and also adjusts so that the torque generated by the motor always equals the load torque. This results in the most efficient use of the energy used to operate pump unit 15. In the equilibrium condition (FIG. 2), 5% of the system pressure is across land 27, 5% is across land 29, 5% across land 31 and 85% is across the motor. 100% system pressure is applied to the rod end of the stroke control piston and 95% of system pressure is applied to the head end. Because the stroke control piston has an area difference of 5% between the rod end and head end (due to the rod area) the forces on each side of the piston are equal and the stroke stays where it is. With the above described system motor stroke is automatically adjusted to meet different torque requirements. For example, if the torque load increases such as would occur if the vehicle mounting the gun was moved from a horizontal surface to an inclined surface and the gun was manipulated, the motor will slow down and a higher percentage of system pressure is necessary to run the motor, for example 95%. Then each of lands has 1⅔% system pressure across it. The stroke control piston has 100% system pressure across the rod end and 98⅓% across the head end. Since the piston is not balanced, the piston moves bearing race 63 to the right in FIGS. 1 and 2. Motor stroke is increased and so is motor torque, until 85% of system pressure again is exerted on the motor. The piston will be stabilized in its new position, the motor stroke and torque will be increased and the motor moves the load by using a high percentage (85%) of the system pressure. Thus, only 15% of the oil energy is dissipated in the control valve. It is thus clear that the motor economically uses the energy supplied to it for driving various sized loads which occur in the elevation and the traversing of a weapon. In other words, by controlling the torque of the motor, it is not necessary to increase the output of the pump to supply increasing quantities of oil to the motor to make up for increased loads. Therefore energy for running the pump is conserved and is economically used.

This fact is illustrated in the table below in which there is a comparison of the present invention and prior art power requirement to elevate a 175 mm. gun from a 15° loading angle to a 65° elevation and back to 15° at a rate of 3 cycles per minute.

|  | Present Invention | | Prior Art (Constant Pressure-Constant Displacement Motor System) | |
| --- | --- | --- | --- | --- |
| Vehicle Position | Level | 10° Slope | Level | 10° Slope |
| Average Electric Power Input. | 1.46 H.P. | 3.4 H.P. | 7.4 H.P. | 7.4 H.P. |
| Average Battery Drain. | 45.5 Amps. | 106 Amps. | 230 Amps. | 230 Amps. |

It is clear that batteries used with the present invention will last much longer than those of the prior art constant pressure-consant displacement motor system. This relieves the demand on not only the batteries themselves but on battery charging devices and the amounts of fuel necessary to operate those devices.

In the automatic stroke control mode, gun velocity is only under very general control because the motor stroke is automatically adjusted so that motor torque equals the load torque until 85% of system pressure appears across the motor. Thus, if the gun is well balanced or tends to run in the direction it is being moved, the motor stroke will be minimum and gun speed will be high. If the gun resists the desired motion, motor stroke will adjust itself to a larger value, and gun speed will be lower. In both cases, the quantity of oil which flows in the system is the same and for any given oil flow the speed of the motor may vary by a factor of 5 or more depending on torque load.

The piston rod motion controls the stroke of the hydraulic motor. Maximum stroke occurs when the motor displaces the maximum amount of fluid for each turn of the motor. The torque developed by the motor is simply:

$$T = \frac{PD}{2\pi} e$$

where $e$ is the motor torque efficiency, P is the applied pressure, D is the displacement per turn, and T is the torque developed. From the formula above, it is seen that by controlling the stroke, and thereby the displacement per turn, the torque is controlled.

It is contemplated that a single reasonably constant pressure source may be utilized for the simultaneous operation of several variable displacement hydraulic motors. Thus, for example, the pump unit 15 provides not only the constant pressure source to operate motor 13 to elevate and depress gun 1 but also to operate a second variable displacement hydraulic motor for traversing the gun.

One gunner has a control valve to elevate the weapon while a second gunner has two valves, one to traverse the gun and a second to control elevation if necessary.

Although I have shown and described certain embodiments of the invention, it will be understood that I do not wish to be limited to the exact construction shown and described, but that various changes and modifications may be made without departing from the spirit and scope of my invention, as provided in the appended claims.

What I claim is:

1. In a constant pressure-variable displacement hydraulic motor system for moving a load, a valve in said system for controlling the quantity of fluid per unit time which moves in said system, a stroke control cylinder, a piston mounted for reciprocation in said cylinder, said piston dividing said cylinder into first and second pressure chambers, first conduit means connecting said first chamber to said valve, second conduit means connecting said second chamber to a source of constant pressure, said piston having an orifice therethrough permitting fluid to flow from said first chamber to said second chamber when there is low fluid flow in the system, a rod connecting said piston to the variable displacement hydraulic motor, said piston and rod adapted to move a bearing forming part of the hydraulic motor to vary the stroke thereof on a change in load on the motor.

2. Control mechanism for varying the displacement of hydraulic motors, a source of constant fluid pressure, a fluid reservoir connected to said pressure source, a valve for controlling the flow of fluid from said pressure source, a first conduit means connecting the pressure source to said valve, second and third conduit means connecting a variable displacement hydraulic motor to said valve to permit the flow of fluid between said valve and the motor to operate the motor, fourth conduit means connecting said valve to said reservoir, a cylinder, a piston reciprocally mounted in said cylinder, said piston dividing said cylinder into two chambers, rod means connecting said piston to the hydraulic motor, fifth conduit means connecting one chamber of said cylinder with said first conduit means, sixth conduit means connecting the other chamber to said valve, said piston being adapted to vary the displacement of the motor.

3. Control mechanism for a variable displacement motor of the type having a bearing which is movable to vary the displacement and thereby the torque of the motor, comprising in combination, a source of substantially constant fluid pressure, a fluid reservoir connected to said source, first fluid conduit means connecting said source to said motor to permit fluid to flow into and operate said motor, second fluid conduit means connecting said motor to said reservoir to permit fluid to return from said motor to said source, valve means connected to said first and second conduit means between said source and said motor for regulating the flow of fluid between said source and said motor, a housing, means movably mounted in said housing adapted to move the bearing of the motor, said movable means dividing said housing into separate chambers, third fluid conduit means connecting one of said chambers to the source of constant fluid pressure, fourth fluid conduit means connecting another of said chambers to said valve means.

4. The structure defined in claim 3 in which said means mounted in said housing is formed with an orifice therethrough to permit fluid to flow between said chambers when there is low flow of fluid between said source and said motor.

5. The combination defined in claim 3 in which the means movably mounted in said housing is a piston, having first and second sides, rod means joined to said first side of said piston to connect said piston to the movable bearing of the motor, said second side of said piston having a surface area greater than the surface area of said first side of said piston.

6. The combination defined in claim 5 in which said piston is formed with means to permit fluid to flow between said chambers when there is a low flow of fluid between said source and said motor to permit full system pressure on both sides of said piston.

7. In apparatus of the class described, a closed hydraulic circuit including a variable displacement hydraulic motor, a source of constant fluid pressure, a valve for controlling the flow of fluid in the circuit, a piston chamber, fluid conducting means connecting the chamber to the valve and to the constant fluid pressure source, a piston mounted for reciprocal movement in the chamber and dividing said chamber into two sections, said piston having an orifice therein adapted to permit full system pressure to be applied to both sides of said piston, an arm connecting the piston to the hydraulic motor, said piston adapted to automatically adjust the motor stroke on a change in load on the motor when a predetermined amount of fluid is permitted to flow in said circuit by said valve.

8. In a hydrodynamic machine of the type having a rotatable cylinder barrel with pistons reciprocally mounted therein, a ring surrounding said cylinder adapted to receive the thrust of said pistons, a pivoted bearing surrounding said ring, a housing, means pivoting said bearing to said housing, antifriction means disposed between said ring and said pivoted bearing, a cylinder connected to said housing, a piston having a low flow orifice therethrough reciprocally mounted in said cylinder and dividing said cylinder into two chambers, a constant pressure source, conduit means connecting said constant pressure source to said motor, a valve connected to said conduit means to control the flow of fluid between said constant pressure source and said motor, a second conduit connecting one of the cylinder chambers to said first conduit, a third conduit connecting the other chamber of said cylinder to the valve, a rod connecting said piston to said pivoted bearing and adapted to pivot said bearing on movement of said piston to vary the piston stroke of said motor.

References Cited by the Examiner

UNITED STATES PATENTS

| | | | |
|---|---|---|---|
| 2,328,717 | 9/43 | Glasner | 103—161 |
| 2,386,459 | 10/45 | Hautzenroeder | 103—161 |
| 2,406,138 | 8/46 | Ferris et al. | 103—161 |
| 2,407,013 | 9/46 | Ilfield | 91—47 |
| 2,673,526 | 3/54 | Horton | 103—161 |
| 2,723,596 | 11/55 | Buchanan | 103—161 |
| 2,741,993 | 4/56 | Orshansky | 103—161 |
| 2,742,879 | 4/56 | Kiester | 91—49 |

FRED E. ENGELTHALER, *Primary Examiner.*

SAMUEL LEVINE, *Examiner.*